United States Patent [19]

Staerzl

[11] Patent Number: 4,523,572

[45] Date of Patent: Jun. 18, 1985

[54] FUEL FLOW MONITOR FOR AN ELECTRONIC FUEL INJECTION CIRCUIT

[75] Inventor: Richard E. Staerzl, Fond du Lac, Wis.

[73] Assignee: Brunswick Corporation, Skokie, Ill.

[21] Appl. No.: 639,386

[22] Filed: Aug. 10, 1984

Related U.S. Application Data

[63] Continuation of Ser. No. 414,881, Sep. 3, 1982, abandoned.

[51] Int. Cl.³ ............................................. F02M 51/00
[52] U.S. Cl. .................................... 123/494; 123/478; 73/114; 73/119 A
[58] Field of Search ................... 123/494, 478, 491; 73/119 A, 113, 114

[56] References Cited

U.S. PATENT DOCUMENTS

| | | | |
|---|---|---|---|
| 3,507,263 | 4/1970 | Long | 123/494 |
| 3,747,577 | 7/1973 | Mauch et al. | 123/494 |
| 3,812,710 | 5/1974 | Bauman et al. | 73/114 |
| 3,998,094 | 12/1976 | Martin | 73/114 |
| 4,012,948 | 3/1977 | Kuno et al. | 73/119 A |
| 4,123,729 | 10/1978 | Buetemeister | 123/494 |
| 4,125,093 | 11/1978 | Platzer, Jr. | 123/494 |
| 4,265,210 | 5/1981 | Hanisko | 123/494 |
| 4,349,000 | 9/1982 | Staerzl | 123/491 |
| 4,359,032 | 11/1982 | Ohie | 123/478 |

*Primary Examiner*—Parshotam S. Lall
*Attorney, Agent, or Firm*—Hopgood, Calimafde, Kalil, Blaustein & Judlowe

[57] ABSTRACT

The invention contemplates fuel flow monitoring apparatus used in conjunction with an electronic fuel injection circuit for an internal-combustion engine. Electronic fuel injection circuits have vastly improved engine performance and efficiency, but their effectiveness has been hampered by the fact that fuel flow has in the past been monitored by mechanical fuel flow sending units. The instant invention eliminates the need for a mechanical fuel flow sending unit and replaces it with electronic circuitry which provides both an indication of fuel flow rate and total fuel consumption. The system also provides the diagnostic capability of monitoring fuel flow rate while the engine is not running.

5 Claims, 2 Drawing Figures

FUEL FLOW MONITOR FOR AN ELECTRONIC FUEL INJECTION CIRCUIT

This application is a continuation application of pending Ser. No. 414,881, filed Sept. 3, 1982, now abandoned.

BACKGROUND OF THE INVENTION

This invention relates to fuel flow monitoring apparatus used in conjunction with an electronic fuel-injection control circuit for an internal-combustion engine of the type described in my co-pending U.S. patent application, Ser. No. 120,467 filed Feb. 11, 1980, now U.S. Pat. No. 4,305,451 and my U.S. Pat. No. 4,280,465 issued July 28, 1981. Reference is made to said application and to said United States Patent for greater descriptive detail of a fuel injection engine, to which the present invention is illustratively applicable.

Typically, in fuel-injection control circuits of the character indicated, fuel flow to the engine and total fuel consumption are monitored by a mechanical fuel flow sending unit. Such units, although in wide use, have all of the inherent disadvantages of mechanical systems, are inoperable when the engine is not running and have none of the flexibility and attendent low costs associated with electronic monitoring systems. More particularly, mechanical fuel flow sending units require that a turbine be inserted in the fuel line, risking blockage if the turbine does not operate. The turbine has inherent mechanical inertia which prohibits the instantaneous response characteristic of electronic units. Also, mechanical fuel flow sending units are typically non-linear at low fuel flow rates and must be sized for a particular fuel line.

BRIEF STATEMENT OF THE INVENTION

It is a general object of the invention to provide an electronic fuel flow monitor circuit for an electronic fuel-injection control circuit.

Another object of the invention is to replace, at decreased cost and increased performance, previously used mechanical fuel flow sending units with an electronic fuel flow monitor.

A further object of the invention is to provide an electronic fuel flow monitor which gives both an indication of fuel flow rate and total fuel consumption.

A still further object of the invention is to provide an electronic fuel flow monitor which functions as a diagnostic tool to measure fuel flow rate even when the associated internal combustion engine is not operating.

Still another object is to achieve the above objects with generally uncomplicated circuitry adaptable to the fuel-mixture requirements of a variety of sizes, styles and uses of different fuel-injected internal combustion engines.

The invention achieves the foregoing objects and certain further features by utilizing an electronic fuel flow monitoring unit in which control pulses generated by an electronic fuel-injection control circuit are used to provide a first signal whose amplitude is indicative of fuel flow rate. The first signal in turn drives a frequency generator whose output frequency is dependent on the amplitude of the first signal. The output of the frequency generator is in turn counted and decoded to provide a signal indicative of total fuel consumption. Fuel flow rate can be monitored even when the associated internal combustion engine is not operating which is a valuable diagnostic feature in evaluation of engine performance.

DETAILED DESCRIPTION

Figure 1:
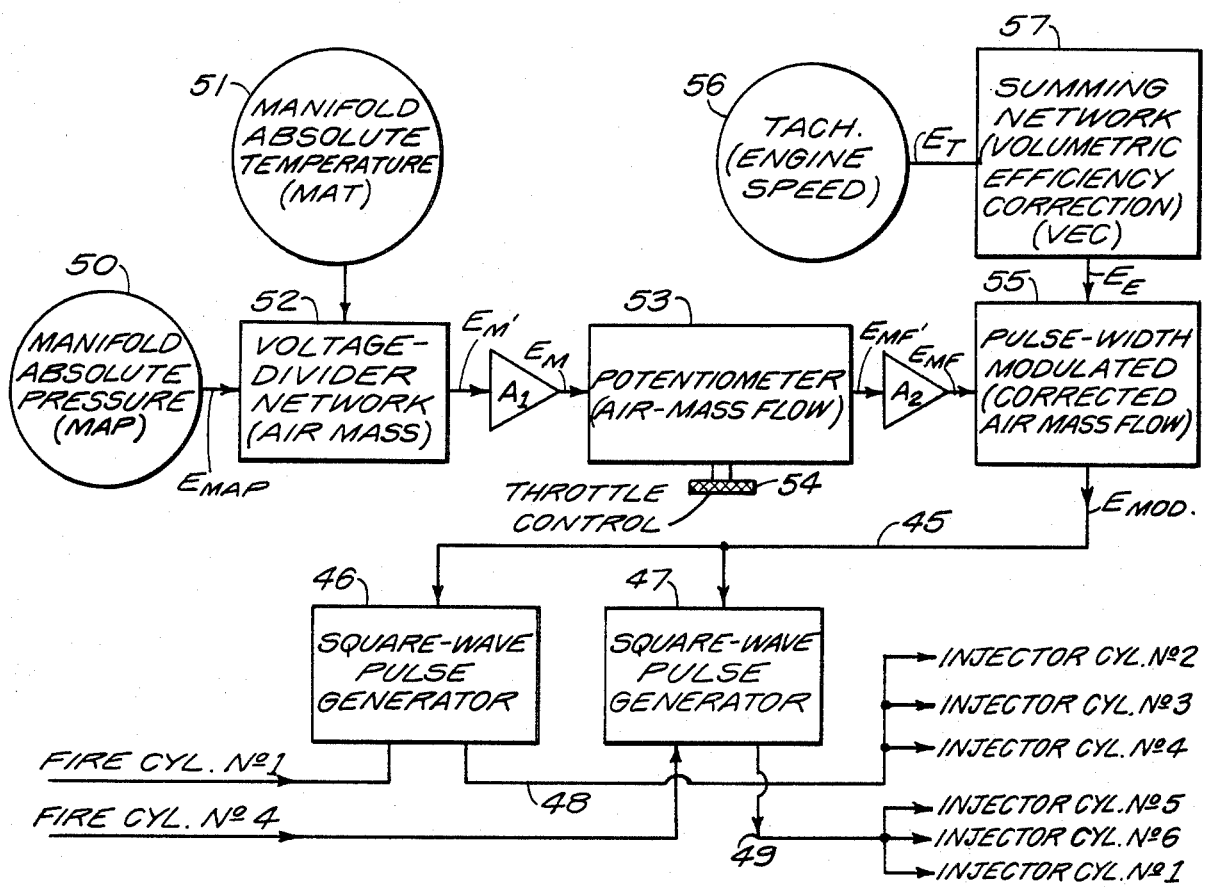
Figure 2:
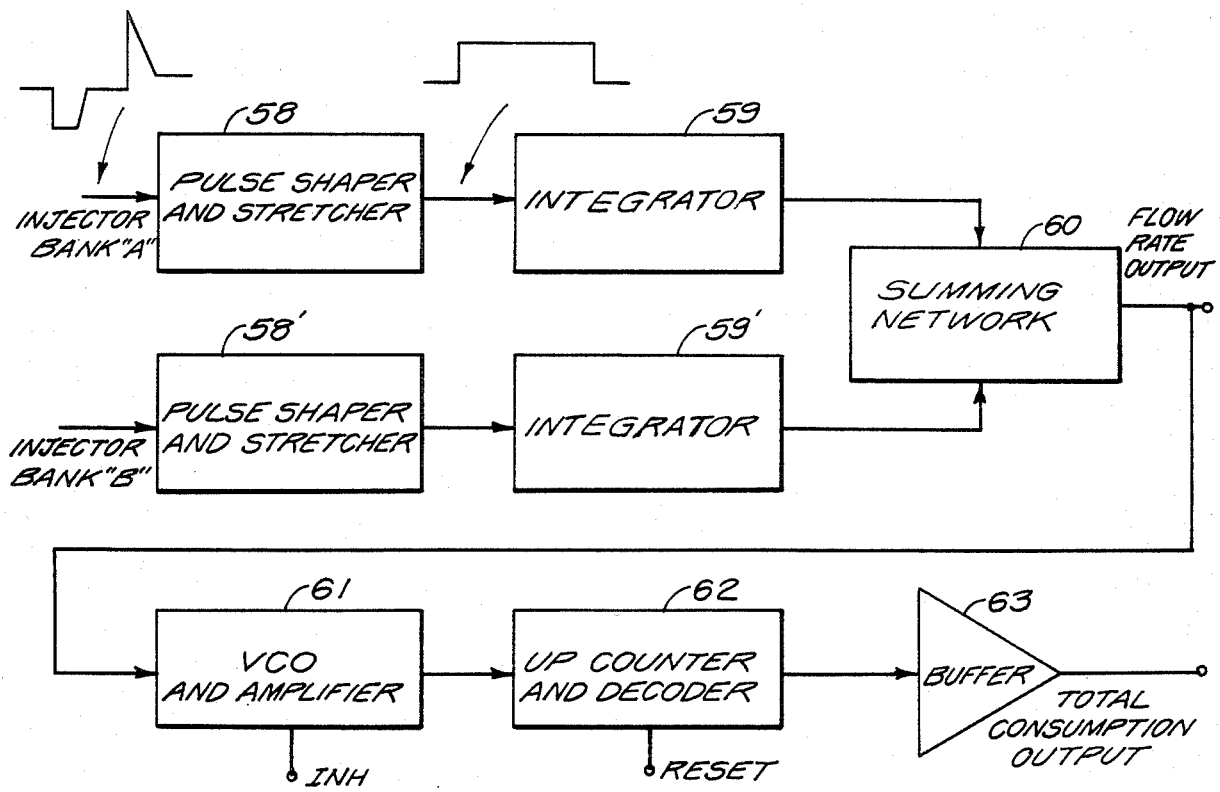

The invention will be described in detail, in conjunction with the accompanying drawings in which:

FIG. 1 is a diagram schematically showing components of an electronic fuel-injection control system for an internal combustion engine; and FIG. 2 is a diagram schematically showing the electronic fuel flow monitor circuit of the instant invention.

In my issued U.S. Pat. No. 4,280,465 the description of which is incorporated herein by reference, a fuel-injection control circuit is described in which one or more square-wave pulse generators drive solenoid operated injectors unique to each cylinder, there being a single control system whereby the pulse generator means is modulated as necessary to accomodate throttle demands in the context of engine speed and other factors. FIG. 1 herein is adopted from said U.S. Patent for purposes of simplified contextual explanation.

The control system of FIG. 1 is shown in illustrative application to a two-cycle six-cylinder 60-degree V-engine wherein injectors for cylinders #2, #3, and #4 (Band "A") are operated simultaneously and (via line 48) under the control of the pulse output of a first square-wave generator 46, while the remaining injectors for cylinders #5, #6 and #1 (Bank "B") are operated simultaneously and (via line 49) under the control of the pulse output of a second such generator 47. The base or crankshaft angle for which pulses generated at 46 are timed is determined by ignition-firing at cylinder #1, and pulses generated at 47 are similarly based upon ignition-firing at cylinder #4, i.e., at 180 crankshaft degrees from cylinder #1 firing. The actual time duration of all such generated pulses will vary in response to the amplitude of a control signal ($E_{MOD}$), supplied in line 45 to both generators 46–47 with a greater amplitude resulting in a pulse of greater duration.

The circuit to produce the modulating-voltage $E_{MOD}$ operates on various input parameters, in the form of analog voltages which reflect air-mass flow for the current engine speed, and a correction is made for volumetric efficiency of the particular engine. More specifically, for the circuit shown, a first electrical sensor 50 of manifold absolute pressure is a source of a first voltage $E_{MAP}$ which is linearly related to such pressure, and a second electrical sensor 51 of manifold absolute temperature may be a thermistor which is linearly related to such temperature through a resistor network 52. The voltage $E_{MAP}$ is divided by the network 52 to produce an output voltage $E_M'$, which is a linear function of instantaneous air mass or density at inlet of air to the engine. A first amplifier A1 provides a corresponding output voltage $E_M$ at the high-impedance level needed for regulation-free application to the relatively low impedance of potentiometer means 53, having a selectively variable control that is symbolized by a throttle knob 54. The voltage output $E_{MF}$, of potentiometer means 53, reflects a "throttle"—positioned pick-off voltage and reflects instantaneous air-mass flow, for the instantaneous throttle (54) setting, and a second amplifier A2 provides a corresponding output voltage $E_{MF}$ for regulation-free application to one of the voltage-multiplier inputs of a pulse-width modulator 55, which is the source of $E_{MOD}$ already referred to.

The other voltage-multiplier input of modulator 55 receives an input voltage $E_E$ which is a function of engine speed and volumetric efficiency. More specifically, a tachometer 56 generates a voltage $E_T$ which is linearly related to engine speed (e.g., crankshaft speed, or reptition rate of one of the spark plugs), and a summing network 57 operates upon the voltage $E_T$ and certain other factors (which may be empirically determined and which reflect volumetric efficiency of the particular engine size and design) to develop the voltage $E_E$ for the multiplier of modulator 55. It is to be understood that although the fuel injection control circuit of FIG. 1 has been illustrated in connection with a two-cycle engine, the same circuit can be used in connection with a four-cycle engine, to which the instant invention is particularly applicable.

The present invention is concerned with the nature and performance of the electronic fuel flow monitor shown in FIG. 2. More particularly, the apparatus illustrated in FIG. 2, is designed to interface with the electronic fuel-injection system of FIG. 1 (or an equivalent electronic fuel-injection system) to monitor the fuel flow rate, whether or not the engine is operating, and to provide an indication of total fuel flow consumption when the engine is operating.

The electronic fuel flow monitor of FIG. 2 can be divided into two main portions, the flow rate circuit and the total fuel consumption circuit. The flow rate circuit consists of pulse shaper and stretcher 58, 58', integrator 59, 59' and summing network 60. The output of summing network 60 is a discrete voltage which represents the flow rate of the associated internal combustion engine. The total fuel consumption circuit consists of a Voltage Controlled Oscillator (VCO) and amplifier 61, an up-counter and decoder 62 and a buffer stage 63. This circuit utilizes the discrete voltage from the flow rate circuit to produce a voltage signal indicative of total fuel consumption.

More particularly, the voltage pulses from square wave pulse generator 46 and 47 (FIG. 1) are applied to pulse shaper and stretcher circuits 58 and 58' respectively. The shape of the waveform is shown in FIG. 2 and the deviation from a standard square wave is a result of the inductive loading imposed by the fuel injector units (not shown). Pulse shaper and stretcher circuits 58, 58' transform the injector pulses into a constant amplitude pulse applied to integrator 59, 59' and the pulse is stretched by approximately 500 microseconds to compensate for the inherent offset of the injector circuit in FIG. 1, as described above. The constant amplitude pulses are integrated by integrators 59, 59' and applied to summing network 60 which sums the signal from the Bank A and Bank B injector pulses. The output of the summing network is a discrete voltage representative of fuel flow rate and this discrete voltage can be utilized by auxiliary instrumentation (not shown) to provide a visual readout of fuel flow rate.

The flow rate output signal is applied to VCO and amplifier 61. The VCO is designated such that its output frequency is directly dependent on the voltage level of the fuel flow rate output signal and the output of the VCO is amplified and applied to up-counter and decoder 62. The VCO also contains an inhibit terminal which is utilized to shut down the VCO when the engine is not running.

Up-counter and decoder 62 counts the output frequency of the VCO. The decoder consists of a resister network which decodes the output of the up-counter into a D.C. voltage which is applied to buffer stage 63. The buffer stage can then be used to drive a digital panel meter or analog meter (not shown) to give a visual indication of total fuel consumption. The up-counter is also provided with a reset terminal which can be used to reset the up-counter to zero.

The described invention will be seen to meet the stated objectives of providing an electronic fuel flow monitor circuit which gives both an indication of fuel flow rate and total fuel consumption. Moreover, the fuel flow rate circuit of the instant invention will operate when the associated internal combustion engine is not operating which provides a diagnostic tool of great value in evaluating engine performance.

While the invention has been described in detail for preferred and illustrative embodiments, it will be understood that modifications may be made without departing from the spirit and claimed scope of the invention.

I claim:

1. In a multi-cylinder internal-combustion engine having an electronically controlled fuel-injection system wherein a pulse generator provides fuel-injection control pulses of time duration proportioned to engine speed and to other factors including desired throttle setting, the pulses each having a duration which is at all times a small fraction of the duration of a full cycle of operation of a given cylinder of the engine, and wherein an electronic fuel flow rate monitor provides indications of fuel flow rate and total engine fuel consumption, the electronic fuel flow rate monitor comprising: pulse shaper means responsive to the fuel injection control pulses for generating an output pulse having a constant amplitude and a predetermined duration for each of the fuel injection control pulses, accumulator means responsive to said output pulses for providing a first signal having an amplitude which is indicative of fuel flow rate, means responsive to said first signal for generating a second signal having a frequency which is dependent on the amplitude of said first signal, and means responsive to said frequency-dependent second signal for providing a third signal having an amplitude which is indicative of total engine fuel consumption.

2. In a multi-cylinder internal-combustion engine in accordance with claim 1 wherein the pulse generator comprises first and second square wave generators each of which provides a separate set of fuel injection control pulses, said pulse shaper means being coupled to said first square wave generator, there being further provided second pulse shaper means coupled to said second square wave generator, and a second accumulator means for providing a second first signal and wherein there is further included summing means for summing said first signal and said second first signal provided in response to each set of fuel injection control pulses and providing the indications of fuel flow rate.

3. In a multi-cylinder internal-combustion engine in accordance with claim 1 wherein said means responsive to said frequency-dependent second signal includes means for accumulating a count of said frequency-dependent signal, and means for decoding said accumulated count into said third signal.

4. In a multi-cylinder internal combustion engine in accordance with claim 1 wherein said accumulator means for providing said first signal includes an integrator.

5. In a multi-cylinder internal combustion engine in accordance with claim 1 wherein said means for generating said frequency-dependent second signal includes means for inhibiting generating of said frequency dependent second signal when the internal combustion engine is not operating.

* * * * *